(12) United States Patent
Maldonado

(10) Patent No.: US 7,900,428 B1
(45) Date of Patent: Mar. 8, 2011

(54) EDGING AND TRIMMING APPARATUS FOR ATTACHMENT TO LAWN MOWERS

(76) Inventor: Ralph Maldonado, Temecula, CA (US)

( * ) Notice: Subject to any disclaimer, the term of this patent is extended or adjusted under 35 U.S.C. 154(b) by 0 days.

(21) Appl. No.: 12/584,412

(22) Filed: Sep. 5, 2009

(51) Int. Cl.
*A01D 34/00* (2006.01)
(52) U.S. Cl. ............... 56/13.7; 56/16.9; 56/251; 56/12.7
(58) Field of Classification Search .................... 56/16.9, 56/17.1, 17.5, 13.7, 12.7; 172/15, 14
See application file for complete search history.

(56) References Cited

U.S. PATENT DOCUMENTS

| | | | | |
|---|---|---|---|---|
| 1,522,129 A * | 1/1925 | Jones et al. | | 56/251 |
| 2,719,400 A | 10/1955 | Lesesne | | |
| 3,053,035 A * | 9/1962 | Earley | | 56/256 |
| 3,421,300 A | 1/1969 | Rhodes | | |
| 3,531,922 A * | 10/1970 | Hansen | | 56/13.7 |
| 3,604,208 A * | 9/1971 | Borunda | | 56/11.5 |
| 3,907,039 A | 9/1975 | Remley | | |
| 4,107,901 A | 8/1978 | Moore | | |
| 4,629,006 A | 12/1986 | Mullet | | |
| 5,179,823 A | 1/1993 | Pace | | |
| 5,483,733 A * | 1/1996 | Hoffman | | 29/463 |
| 5,497,606 A | 3/1996 | Baxter | | |
| 5,560,189 A | 10/1996 | Devillier | | |
| 5,771,670 A * | 6/1998 | Perry | | 56/12.1 |
| 6,256,970 B1 | 7/2001 | Fleener | | |
| 6,434,920 B1 * | 8/2002 | Keane | | 56/16.9 |
| 6,701,700 B2 | 3/2004 | Keane | | |
| 6,779,325 B1 | 8/2004 | Robillard | | |
| 6,938,699 B2 | 9/2005 | Templeton | | |
| 7,516,602 B1 * | 4/2009 | O'Dell | | 56/16.9 |
| 2004/0148784 A1 | 8/2004 | Grace | | |

* cited by examiner

*Primary Examiner* — Árpád Fábián-Kovács
(74) *Attorney, Agent, or Firm* — Dennis W. Beech

(57) ABSTRACT

A gear assembly may have a first gear attached to a gear shaft and a second gear attachable to a powered rotating element of a mowing machine. An attachment element may have a shaft hole with the gear shaft rotatably inserted through the shaft hole with one end of the gear shaft positioned in a coupling end of the attachment element. A trimming device with a trimmer tube open at a first end and an end of a shaft of the trimming device with a shaft socket fitting inserted in the coupling end of the attachment element for the shaft socket fitting to engage the gear shaft. An anti-rotating clamp attached adjacent the first end of the trimmer tube for positioning and retention in a clamp recess in a front face of the coupling end to inhibit rotation of the trimmer tube in the coupling end.

19 Claims, 5 Drawing Sheets

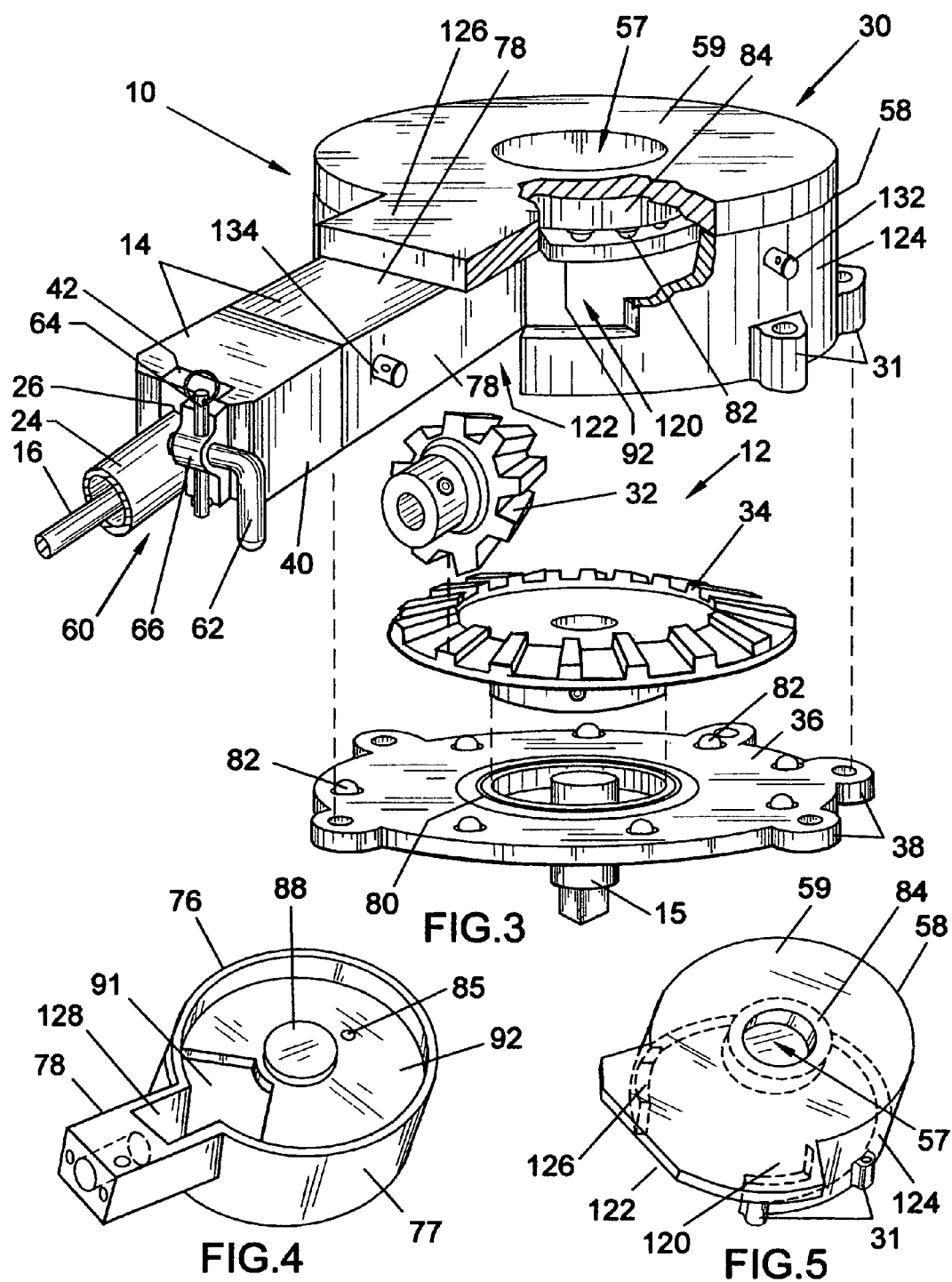

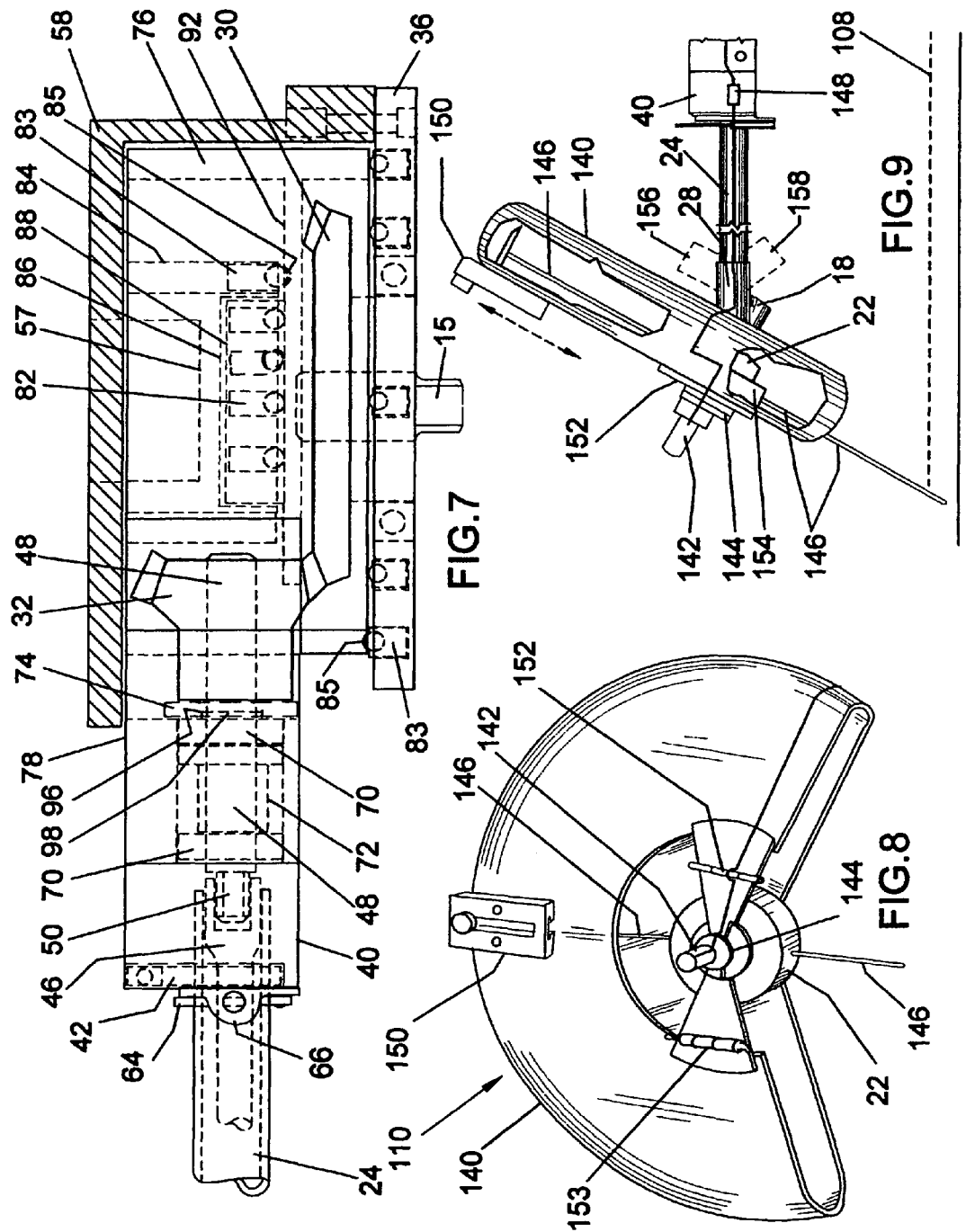

EDGING AND TRIMMING APPARATUS FOR ATTACHMENT TO LAWN MOWERS

BACKGROUND OF THE INVENTION

This invention relates to apparatus for attachment to lawn mowing machines for use to edge and trim grass and weeds generally at the edges of a lawn and grass area or adjacent to obstacles. The new apparatus attaches to a mower blade housing to extend outwardly from the side of a mower or lawn tractor to rotate a cutting element adjacent the perimeter of the mower blade housing. The apparatus may be linked to the cutting blade power system or more directly to the mower engine.

Edging and trimming devices for lawn mowers may currently be known. Specially designed edging and trimming assemblies for use with lawn mowers may include a shaft extending through a hollow arm with the arm connected to a mower deck through a hub for pivotal movement of the arm. A gear system that has friction contact gear elements may be connected to the lawn mower's power driven pulley system and to one end of the shaft. A trimmer head may be attached to an opposed end of the shaft for cutting grass upon rotation of the trimmer head. The use of friction contact gear elements may be a weak engagement link for powering the trimmer head. Use of a specially designed hollow arm and shaft may be more costly than use of mass produced hand held trimming devices known in the art.

SUMMARY OF THE INVENTION

The present invention is directed to apparatus for attachment to lawn mowing machines for use to edge and trim grass and weeds. A gear assembly may have a first gear attached to a gear shaft and a second gear attachable to a powered rotating element of a mowing machine. An attachment element may have a shaft hole with the gear shaft rotatably inserted through the shaft hole with one end of the gear shaft positioned in a coupling end of the attachment element. A trimming device with a trimmer tube open at a first end and an end of a shaft of the trimming device with a shaft socket fitting inserted in the coupling end of the attachment element for the shaft socket fitting to engage the gear shaft. An anti-rotating clamp attached adjacent the first end of the trimmer tube for positioning and retention in a clamp recess in a front face of the coupling end to inhibit rotation of the trimmer tube in the coupling end.

These and other features, aspects and advantages of the present invention will become better understood with reference to the following drawings, description and claims.

BRIEF DESCRIPTION OF THE DRAWINGS

FIG. 3 illustrates an exploded perspective view of the gear assembly of the apparatus according to an embodiment of the invention;

FIG. 4 illustrates a top perspective view of a gear housing according to an embodiment of the invention;

FIG. 5 illustrates a top perspective view of a cover member according to an embodiment of the invention;

FIG. 7 illustrates a partial cross-sectional elevation view of the apparatus according to an embodiment of the invention;

FIG. 8 illustrates a perspective view of a trimmer head according to an embodiment of the invention;

FIG. 9 illustrates a side view of a trimmer head according to an embodiment of the invention;

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
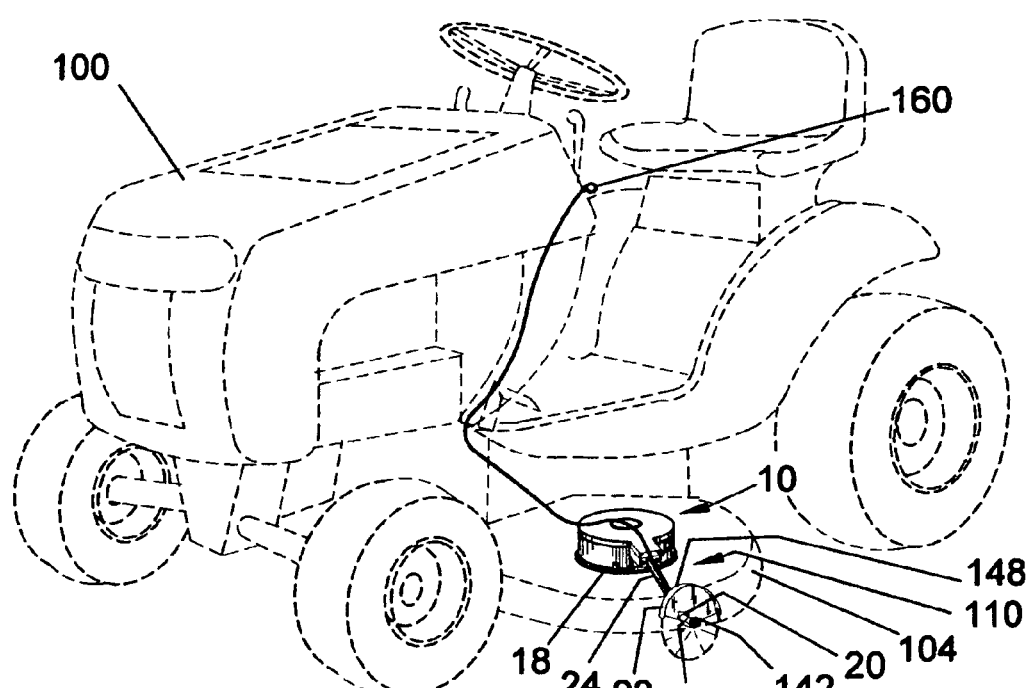
FIG. 1 illustrates a top perspective view of an edging and trimming apparatus attached to a lawn mower blade housing according to an embodiment of the invention.
Figure 2:
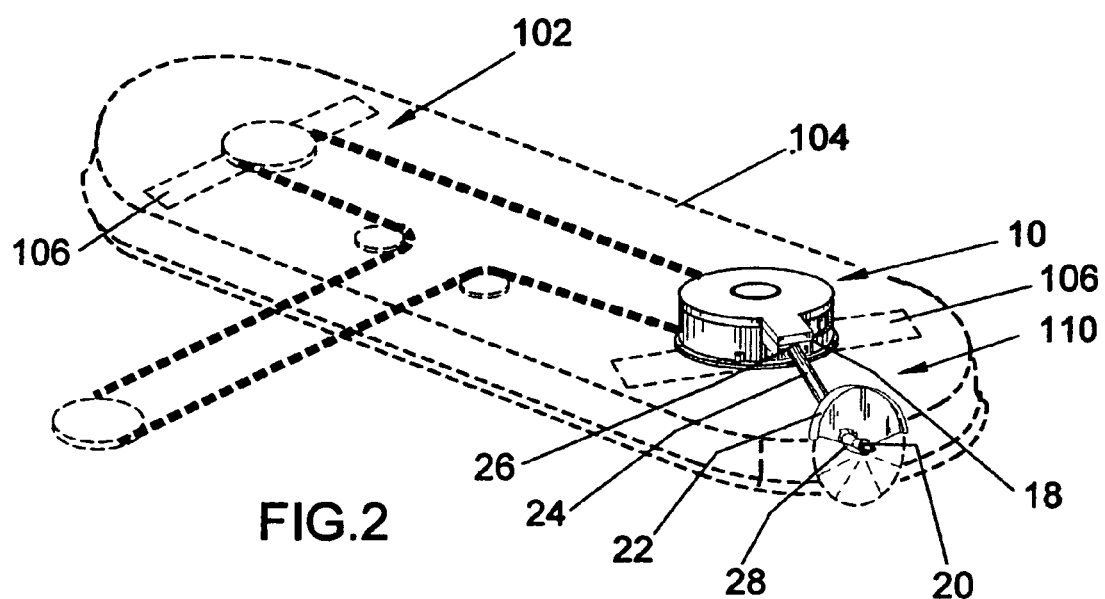
FIG. 2 illustrates a perspective view of the apparatus attached to a lawn mower blade housing according to an embodiment of the invention.
Figure 6:
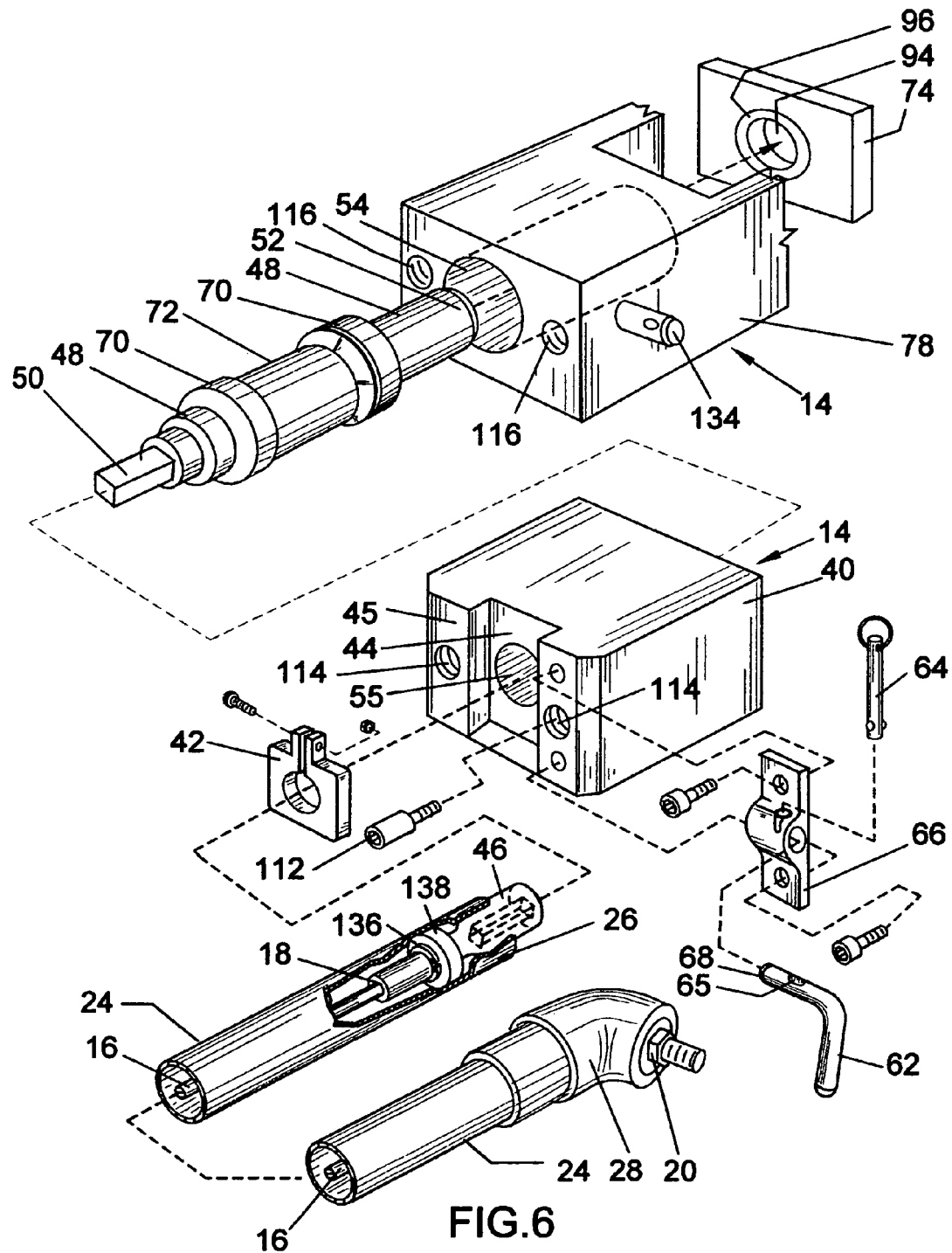
FIG. 6 illustrates an exploded view of an attachment element and drive shaft according to an embodiment of the invention.
Figure 10:
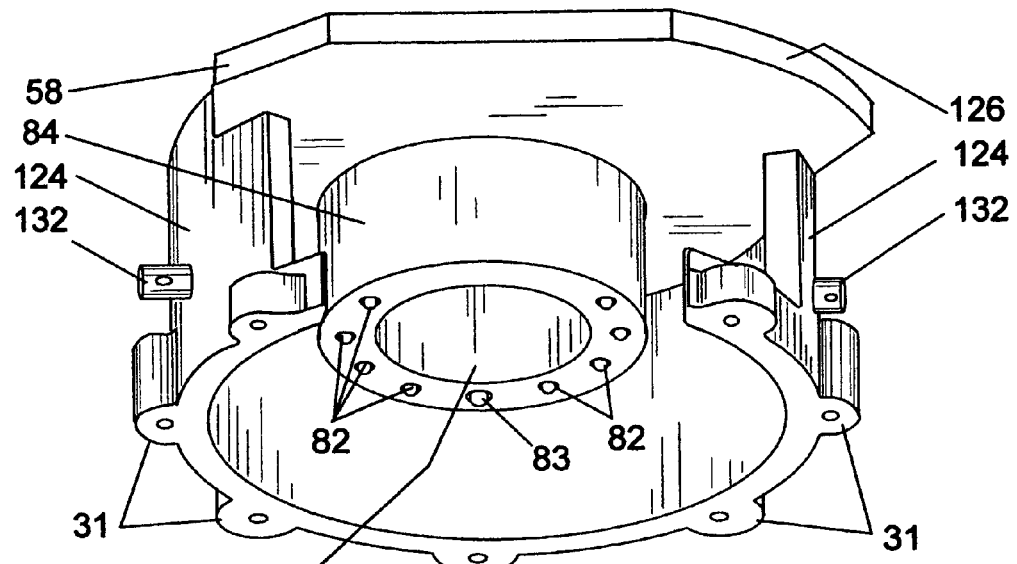
FIG. 10 illustrates a perspective view of a cover member according to an embodiment of the invention.
Figure 11:
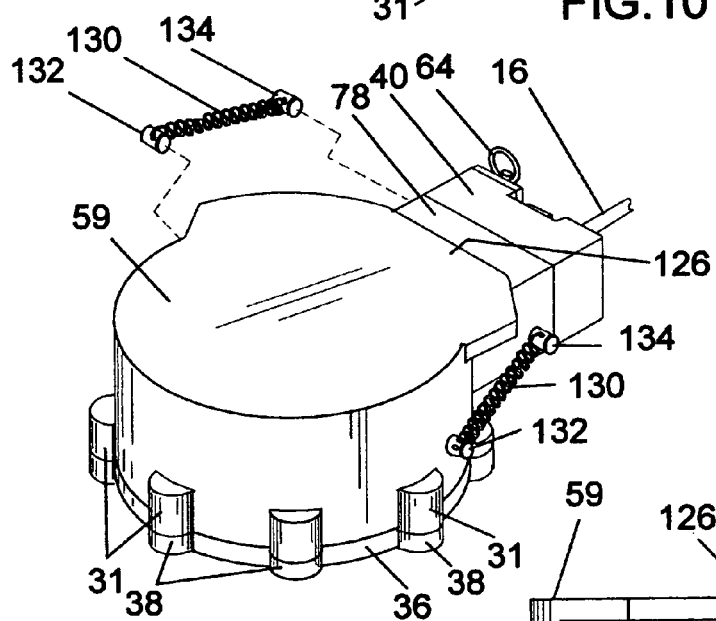
FIG. 11 illustrates a perspective view of an edging and trimming apparatus without a trimmer device attached according to an embodiment of the invention.
Figure 12:
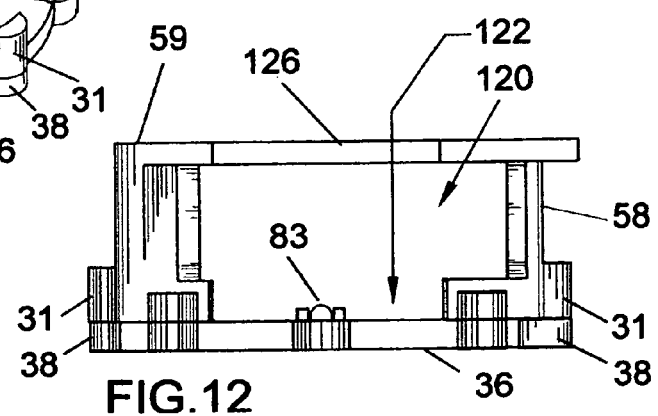
FIG. 12 illustrates a side elevation view of an apparatus housing with pedestal removed according to an embodiment of the invention.

Referring to FIGS. 1 through 7, an edging and trimming apparatus 10 for attachment to lawn mowers may be used with a lawn tractor 100 that may generally have a tractor with a motor and an operator seat with a grass mowing apparatus 102 attached under the tractor chassis. There may be one or two rotor blades 106 positioned in a blade housing 104 to protect the operator. The description is not intended to limit attachment and use of the apparatus to lawn tractors as the apparatus may be attached to any lawn mowing machine that has a blade housing and motor driven shaft for attachment of a gear assembly.

The apparatus 10 may have a gear assembly 12 with a drive shaft 15 for attachment to a powered rotating element of the mower 100. The gear assembly 12 may be attached to an attachment element 14 that may receive and be connected to a shaft 16 at one end 18 and may have at an opposite end 20 a trimmer head 22 attached. The shaft 16 may be routed through a trimmer tube 24 that may be attached at a second end 28 to the trimmer head 22 and at a first end 26 may be attached to the attachment element 14. The elements of the trimmer head, trimmer tube and shaft may be an apparatus known in the art as a hand held weed cutter or trimmer 110 with the engine and hand holding devices removed. The apparatus 10 may allow use of various hand held trimming devices 110 to obviate the need to produce a special apparatus.

The trimmer tube 24 and shaft 16 at a first end 18 may be insertable in coupling end 40 of the attachment element 14. The trimmer tube 24 may have an anti-rotating clamp 42 attached at the first end 26 that may be inserted in a clamp recess 44 in a front face 45 of the coupling end 40 shaped to engage the clamp 42 to prevent its rotation. The shaft 16 at the first end 18 may have a shaft socket fitting 46 that may be slidably inserted on a gear shaft 48 on a pin end 50 of the gear shaft 48. The tube 24 and first end 18 may be retained in place by an attachment device 60 positioned on the attachment element 14 that may have an "L" shaped retainer pin 62 with a locking detent pin 64. The pin 62 may be inserted through a pin bracket 66 to position an attachment end 68 adjacent the anti-rotation clamp 42. This may prevent the tube 24 from sliding out of the coupling end 40.

The gear shaft 48 may have a pin end 50 and a gear end 52 with the gear shaft 48 rotatably positioned in shaft hole 54 of a shaft bearing element 78 of the gear housing 76. A driven gear 32 of the gear assembly 12 may be attached to the gear end 52 and be positioned to engage a drive gear 34 that may be attached to the powered rotating element that may be a pulley or pulley shaft. The drive gear 34 may be positioned in a roller bearing 80 positioned in a base member 36 and a drive shaft 15 may be attached to the drive gear 34 for engagement with the powered rotating element of a mower 100.

The base member 36 that may be generally a flat plate structure may have mounting lugs 38 at the periphery for insertion of fasteners to attach the base member 36 and a cover member 58 that may have attachment lugs 31 to the blade housing 104 of a lawn mower 100. The gear housing 76 may be rotatably positioned on the base member 36 and in the cover member 58. The base member 36 may have ball plunger bearings 82 positioned adjacent its periphery on which the vertical wall 77 of the gear housing 76 may be positioned for rotation. The cover member 58 may have a centrally positioned pedestal 84 with a gear housing cavity 86 for receipt of a gear housing protrusion 88. The pedestal 84 may have ball plunger bearings 82 positioned in the subtending wall 90 for the bearings 82 to be positioned against the top cover 92 of the gear housing 76 to urge the driven gear 32 against drive gear 34 and the gear housing 76 against the roller bearing 80 and base member 36. The base member 36 and pedestal 84 are described as having roller bearings 80; however, other suitable types of bearings may be used, for example, springs and a thrust bearing or other spring load bearing devices. The top cover 59 and pedestal 84 may have a cavity 57 formed therein to reduce the amount of material required for forming the cover member 58.

The shaft bearing element 78 may have bearings 70 spaced apart by a sleeve 72 to facilitate rotation of the gear shaft 48. The bearings 70 assembly may be retained in the shaft bearing element 78 by a removably fastened end plate 74. The gear assembly 12 may have a gear ratio of 3:1 to translate, for example, a lawn mower pulley shaft speed for the gear shaft 48. The gear assembly 12 illustrated in the Figures has two bevel gears 32, 34 to change shaft rotation 90 degrees. Other gear combinations are possible depending on the lawn mower structure and trimmer head 22 structure.

The cover member 58 may have a generally longitudinal slot 120 in side wall 124 sized and positioned for movement of the attachment element 14 horizontally in the slot 120. There may be an opening 122 in the side wall 124 below the slot 120 to allow placement of the cover member 58 over the gear housing 76 with the gear bearing element 78 of the attachment element 14 protruding outwardly from the cover member 58. This structure may allow the gear housing 76 to rotate in the cover member 58 on the base member 36. A spring 130 may be attached to a first spring mount 132 on the cover member 58 and to a second spring mount 134 on the attachment element 14 to bias the gear housing 76 in a first position for cutting a lawn. If the trimmer device 110 may hit an obstacle, the gear housing 76 may rotate against the spring 130 bias to avoid damage to the apparatus 10. The trimmer device 110 may be allowed to rotate horizontally in two directions and there may be a spring 130 attached on each side of the attachment element 14. The top cover 92 of the gear housing 76 may have detents 85 positioned to receive one or more detent bearings 83 to act to maintain the gear housing 76 in a desired orientation as urged by the springs 130. The base member 36 may also have detent bearings 83 positioned to engage detents 85 positioned in the side wall 124 of cover member 58.

The top cover 59 of the cover member 58 may have an extended cover element 126 positioned to cover an access opening 128 in the gear housing 76 top cover 92. The access opening 128 and an access opening 91 may allow access to the gear end 52 of the gear shaft 48, to the driven gear 32 and to the end plate 74. The gear shaft 48 may have a flange 98 positioned intermediate the gear end 52 and a bearing 70 to be adjacent the end plate 74 in a groove 96 adjacent the end plate aperture 94 through which the gear shaft 48 protrudes. This structure may aid in maintaining the bearings 70 and gear shaft 48 in position in the shaft hole 54.

The trimmer tube 24 adjacent the first end 26 may have a bearing 138 to retain the shaft socket fitting 46 in the tube 24 on the shaft 16 when the trimmer device 110 may be removed from the coupling end 40. A clip 136 may be used to retain the fitting 46 in the bearing 138.

Referring to FIGS. 1, 2, 8 and 9, the trimmer guard 140 of the trimmer head 22 may be modified to install a solenoid 142 adjacent the spool control 144 of the trimmer head 22. This may allow a user to activate the solenoid 142 while operating the lawn mower to cause additional cutting word 146 to spool outwardly. The solenoid may be connected to a connector 148 on the trimmer guard 140 or other convenient location to facilitate removal of the trimming device 110 from the lawn mower. The connector may be connected to a switch 160, see FIG. 1, convenient to the lawn mower operator. There may also be an adjustable cutting cord cutter 150 that may be manually positioned to cut a desired cord 146 length. The solenoid 142 may be attached to a hinged portion of the guard 140 by a hinge 152 that allows the solenoid to be moved when it is desired to remove the spool 154 to add cutting cord 146.

The trimmer tube 24 and shaft may be attached to the trimmer head 22 at various angles as illustrated by the dash line elements 156, 158 at the second end 28 location in FIG. 9. The position 156 of the trimmer tube 24 may be generally parallel to the trimmer guard 140. At this position the cutting cord 146 may be positioned to cut parallel to a grass area 108 or surface when the trimmer tube 24 may be rotated for such oriented when attached to the coupling end 40. The position 156 of the trimmer tube 24 may be generally perpendicular to the trimmer guard 140. At this position the cutting cord 146 may cut perpendicular to a grass area 108 for purposes of trimming. The solid line illustration of the trimmer tube 24 positioned allows an angled trimming cut of grass at for example of a grass area 108.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for attachment to lawn mowing machines for use to edge and trim grass and weeds comprising:
   a gear assembly with a first gear attached to a gear shaft and a second gear attachable to a powered rotating element of a mowing machine;
   an attachment element of an apparatus housing having a shaft hole with said gear shaft rotatably disposed in said shaft hole with a connector end of said gear shaft positioned in a coupling end of said attachment element;
   a trimming device with a trimmer tube open at a first end with a first end of a shaft disposed in said trimmer tube and said first end of said trimmer tube inserted in said coupling end to position a shaft socket fitting of said first end of said shaft on said gear shaft;
   an anti-rotating clamp attached adjacent said first end of said trimmer tube disposed for positioning in a clamp recess in a front face of said coupling end to inhibit rotation of said trimmer tube in said coupling end; and an attachment device to retain said anti-rotating clamp in said clamp recess.

2. The apparatus as in claim 1 wherein:

said apparatus housing has a base member with a roller bearing approximately centrally disposed therein and said second gear is positioned in said roller bearing;

a gear housing with said attachment element may be disposed on said base member for engagement of said first gear with said second gear; and a cover member may be positioned over said gear housing with said attachment element protruding therefrom, and said cover member and said base member attachable to said powered rotating element.

3. The apparatus as in claim 2 wherein:

said cover member having a horizontal slot in a side wall sized and disposed for said attachment element to move radially in said horizontal slot;

said gear housing rotatably disposed in said cover member on said base member; and said gear housing biased by a spring to remain in a first slot position.

4. The apparatus as in claim 3 wherein said base member has a plurality of ball plunger bearings disposed adjacent a periphery for a vertical wall of said gear housing to engage.

5. The apparatus as in claim 3 wherein:

said cover member has a centrally positioned pedestal attached and subtending from a top cover; and said pedestal having a gear housing cavity disposed for receipt of a gear housing protrusion extending upwardly from a gear housing top cover.

6. The apparatus as in claim 5 wherein a subtending wall of said pedestal has a plurality of ball plunger bearings disposed therein to engage said gear housing top cover.

7. The apparatus as in claim 3 wherein said side wall having an opening between said horizontal slot and said side wall bottom edge.

8. The apparatus as in claim 1 wherein:

said gear shaft is disposed in a first bearing and a second bearing spaced apart by a sleeve to form a shaft assembly;

said shaft assembly is disposed in said shaft hole in a shaft bearing element of said attachment element; and said shaft assembly is retained in said shaft hole by attachment of said coupling end adjacent said pin end of said gear shaft and by attachment of an end plate adjacent a gear end of said gear shaft.

9. The apparatus as in claim 8 wherein:

said end plate having an aperture therein for insertion of said gear shaft; and said gear shaft has a flange disposed to be adjacent a groove formed adjacent said aperture when said end plate is attached to said shaft bearing element.

10. The apparatus as in claim 1 wherein said attachment device is a pin bracket attached to a front face of said coupling end disposed for a retainer pin to be inserted through said pin bracket to position an attachment end in front of said anti-rotating clamp.

11. The apparatus as in claim 10 wherein said retainer pin is retained in said pin bracket by insertion of a locking pin in a pin hole therein.

12. The apparatus as in claim 3 wherein said spring is attached at a first end to a first spring mount on said cover member and at a second end to a second spring mount on said attachment element.

13. The apparatus as in claim 3 wherein said cover member top cover has an extended cover element disposed to be positioned over said attachment element having an access opening therein.

14. The apparatus as in claim 1 wherein a shaft bearing is disposed in said trimmer tube adjacent said open end to retain said shaft in said trimmer tube.

15. The apparatus as in claim 1 wherein:

said trimming device has a trimmer head with a trimmer guard at a second end of said trimmer tube;

a solenoid is attached to said trimmer guard disposed to engage a spool control of a spool; and said solenoid electrical connected to a power source and an activation switch.

16. The apparatus as in claim 15 wherein there is a hinge to allow rotation of the solenoid away from said spool.

17. The apparatus as in claim 15 wherein there is an adjustable cord cutter attached to said trimmer guard to adjust a cutting cord length.

18. The apparatus as in claim 3 wherein said base member has a detent bearing disposed to engage a detent in a vertical wall of said gear housing.

19. The apparatus as in claim 5 wherein a subtending wall of said pedestal has a detent bearing disposed to engage a detent in said gear housing top cover.

* * * * *